US010576943B2

(12) United States Patent
Feigel

(10) Patent No.: US 10,576,943 B2
(45) Date of Patent: Mar. 3, 2020

(54) ELECTRONIC BRAKE SYSTEM

(71) Applicant: MANDO CORPORATION, Gyeonggi-do (KR)

(72) Inventor: Hansjerg Feigel, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 40 days.

(21) Appl. No.: 15/677,006

(22) Filed: Aug. 14, 2017

(65) Prior Publication Data
US 2018/0050670 A1  Feb. 22, 2018

(30) Foreign Application Priority Data

Aug. 16, 2016 (KR) .................. 10-2016-0103402

(51) Int. Cl.
*B60T 8/40* (2006.01)
*B60T 7/04* (2006.01)
(Continued)

(52) U.S. Cl.
CPC .............. *B60T 7/042* (2013.01); *B60T 8/326* (2013.01); *B60T 13/662* (2013.01);
(Continued)

(58) Field of Classification Search
CPC .......... B60T 7/042; B60T 8/326; B60T 8/321; B60T 8/3645; B60T 8/4018;
(Continued)

(56) References Cited

U.S. PATENT DOCUMENTS 8,827,377 B2 * 9/2014 Nishioka ................. B60T 7/042
  303/10
9,037,375 B2 * 5/2015 Tahara .................... B60T 7/042
  701/70

(Continued)

FOREIGN PATENT DOCUMENTS

CN    105644539    6/2016
CN    105691372    6/2016
(Continued)

OTHER PUBLICATIONS

Office Action dated Jun. 26, 2019 for Chinese Patent Application No. 201710703427.1 and its English machine translation by Google Translate.

*Primary Examiner* — Thomas W Irvin
(74) *Attorney, Agent, or Firm* — Ladas & Parry, LLP

(57) ABSTRACT

According to an aspect of the present disclosure, it provides an electronic brake system including a pedal simulator configured to provide a reaction force according to a pedal force of a brake pedal, an actuator configured to generate a hydraulic pressure using an actuator piston that operates by an electrical signal output corresponding to a displacement of the brake pedal and including a first chamber provided at one side of the actuator piston movably accommodated in an actuator cylinder and connected to one or more wheel cylinders and a second chamber provided at the other side of the actuator piston and connected to one or more wheel cylinders, a first hydraulic circuit including first and second inlet flow channels branched from a first hydraulic flow channel configured to communicate with the first chamber to be connected to two wheel cylinders, respectively a second hydraulic circuit including third and fourth inlet flow channels branched from a second hydraulic flow channel configured to communicate with the second chamber to be connected to two wheel cylinders, respectively, and a res- (Continued)

ervoir connected to the actuator and the first and second hydraulic circuits and configured to store brake fluid, wherein a hydraulic pressure unit connected from the actuator to the one or more wheel cylinders are hydraulically separated from a pedal force unit connected from the brake pedal to the pedal simulator.

20 Claims, 5 Drawing Sheets

(51) Int. Cl.
*B60T 8/32* (2006.01)
*B60T 13/68* (2006.01)
*B60T 13/66* (2006.01)
*B60T 13/74* (2006.01)
B60T 8/36 (2006.01)

(52) U.S. Cl.
CPC .......... *B60T 13/686* (2013.01); *B60T 13/745* (2013.01); *B60T 8/321* (2013.01); *B60T 8/3645* (2013.01); *B60T 8/4018* (2013.01); *B60T 8/4081* (2013.01); *B60T 2270/404* (2013.01); *B60T 2270/413* (2013.01); *B60T 2270/82* (2013.01)

(58) Field of Classification Search
CPC .... B60T 8/4081; B60T 13/662; B60T 13/686; B60T 13/745; B60T 2270/404; B60T 2270/413; B60T 2270/82
See application file for complete search history.

(56) References Cited

U.S. PATENT DOCUMENTS

| | | | |
|---|---|---|---|
| 9,315,180 B2* | 4/2016 | Jungbecker | B60T 8/4081 |
| 9,346,443 B2* | 5/2016 | Koo | B60T 11/20 |
| 9,573,578 B2* | 2/2017 | Shimada | B60T 13/146 |
| 9,707,945 B2* | 7/2017 | Sakurazawa | B60T 8/4081 |
| 9,834,188 B2* | 12/2017 | Feigel | B60T 8/326 |
| 10,259,437 B2* | 4/2019 | Nishiwaki | B60T 17/22 |
| 2014/0131154 A1 | 5/2014 | Ganzel | |
| 2016/0264113 A1 | 9/2016 | Feigel | |
| 2018/0334146 A1* | 11/2018 | Feigel | B60T 7/042 |
| 2018/0334148 A1* | 11/2018 | Feigel | B60T 7/042 |
| 2018/0334149 A1* | 11/2018 | Feigel | B60T 7/042 |

FOREIGN PATENT DOCUMENTS

| | | |
|---|---|---|
| CN | 105745126 | 7/2016 |
| EP | 2 520 473 | 11/2012 |

\* cited by examiner

ELECTRONIC BRAKE SYSTEM

CROSS-REFERENCE TO RELATED APPLICATION

This application claims the priority to Korean Patent Application No. 10-2016-0103402, filed on Aug. 16, 2016 in the Korean Intellectual Property Office, the disclosure of which is incorporated herein by reference in its entirety.

TECHNICAL FIELD

The present disclosure relates to an electronic brake system, and more particularly, to an electronic brake system that generates a brake force using an electrical signal corresponding to a displacement of a brake pedal.

BACKGROUND ART

A vehicle is essentially equipped with a brake system for braking. Recently, various types of systems have been suggested to provide a more powerful and stable braking force.

Examples of the brake system include an anti-lock brake system (ABS) that prevents slippage of a wheel during braking and a brake traction control system (BTCS) that prevents slippage of a drive wheel during sudden start or sudden acceleration of a vehicle, and an electronic stability control system (ESC) that stably maintains the running state of the vehicle by controlling a brake hydraulic pressure by combining ABS and BTCS.

Generally, an electronic brake system includes an actuator that receives an electric signal of a braking force of a driver from a pedal displacement sensor that detects a displacement of a brake pedal when the driver steps on the brake pedal, and supplies pressure to a wheel cylinder.

An electronic brake system equipped with such an actuator is disclosed in European Patent EP 2 520 473. According to the disclosed document, the actuator is provided to generate a brake pressure by operating a motor according to a pedal force of a brake pedal. At this time, the brake pressure is generated by converting a rotational force of the motor into a linear motion and pressing a piston.

RELATED ART DOCUMENT

Patent Document

EP 2 520 473 A1 (Honda Motor Co., Ltd.) Nov. 7, 2012

DISCLOSURE

Technical Problem

Embodiments of the present disclosure are directed to providing an electronic brake system that generates a brake pressure using a double-acting actuator without a master cylinder.

In addition, embodiments of the present disclosure are directed to providing an electronic brake system capable of dealing with a malfunction of an actuator even without a master cylinder.

Technical Solution

According to an aspect of the present disclosure, there is provided an electronic brake system including a pedal simulator configured to provide a reaction force according to a pedal force of a brake pedal, an actuator configured to generate a hydraulic pressure using an actuator piston that operates by an electrical signal output corresponding to a displacement of the brake pedal and including a first chamber provided at one side of the actuator piston movably accommodated in an actuator cylinder and connected to one or more wheel cylinders and a second chamber provided at the other side of the actuator piston and connected to one or more wheel cylinders, a first hydraulic circuit including first and second inlet flow channels branched from a first hydraulic flow channel configured to communicate with the first chamber to be connected to two wheel cylinders, respectively, a second hydraulic circuit including third and fourth inlet flow channels branched from a second hydraulic flow channel configured to communicate with the second chamber to be connected to two wheel cylinders, respectively, and a reservoir connected to the actuator and the first and second hydraulic circuits and configured to store brake fluid, wherein a hydraulic pressure unit connected from the actuator to the one or more wheel cylinders are hydraulically separated from a pedal force unit connected from the brake pedal to the pedal simulator.

Also, the electronic brake system may further include an electronic control unit for signal processing and controlling of the actuator and electrical valves, wherein the actuator further may include a driving unit configured to generate a rotary force by power supplied thereto, the driving unit includes a first driving unit and a second driving unit configured to selectively or together operate with the first driving unit, and the electronic control unit includes a first electronic control unit connected to the first driving unit and a second electronic control unit connected to the second driving unit.

Also, the driving unit may be operated by the second electronic control unit when the first electronic control unit abnormally operates or may be operated by the first electronic control unit when the second electronic control unit abnormally operates.

Also, one or more of the electronic valves controlled by the ECU may include two coils respectively connected to the first and second electronic control units, and one of the two coils may be operated by the second electronic control unit when the first electronic control unit operates abnormally, and the other one may be operated by the first electronic control unit when the second electronic control unit operates abnormally.

Also, the electronic brake system may further include a pedal displacement sensor configured to detect a displacement of the brake pedal, a circuit hydraulic sensor configured to detect a hydraulic pressure of the first or second hydraulic circuit, and a driving displacement sensor configured to detect an amount of rotation of the driving unit, wherein one or more of the pedal displacement sensor, the circuit hydraulic sensor, and the driving displacement sensor each include a main sensor and an auxiliary sensor, and the auxiliary sensor is a redundancy sensor provided to operate when the main sensor abnormally operates.

Also, the first and second chambers are connected to each other with a balance valve.

Also, the balance valve may be a normally closed type valve that operates to be normally closed and be opened when an opening signal is received.

Also, the electronic brake system may further include a third hydraulic flow channel configured to communicate with the first chamber and be connected to the second hydraulic circuit, and a fourth hydraulic flow channel configured to communicate with the second chamber and be connected to the first hydraulic circuit.

Also, the first to fourth hydraulic flow channels respectively may include first to fourth hydraulic check valves configured to allow a fluid flow from the actuator only toward the one or more wheel cylinders.

Also, the actuator may include the actuator may include a piston cylinder unit configured to operate on the power from the driving unit and including the actuator piston and the first and second chambers, and the driving unit may include a power transmission unit configured to convert the rotary force into straight-line motion of the actuator piston.

Also, the driving unit may include a motor including a stator and a rotor, and a rotation shaft member connected to the rotor to rotate together with the rotor, the rotor may include a hollow therein, and the rotation shaft member may be disposed in the hollow of the rotor.

Also, the pedal simulator may include a simulator block including a simulator bore, a simulator piston configured to reciprocate in a straight line in the simulator bore, and a simulator elastic member disposed between the simulator piston in the simulator bore and the simulator block, and the simulator piston may be connected to the brake pedal via an input rod.

Also, the reservoir may include a first reservoir chamber configured to supply brake fluid to the actuator and receive brake fluid from the actuator, a second reservoir chamber configured to receive brake fluid from a first hydraulic circuit, and a third reservoir chamber configured to receive brake fluid from a second hydraulic circuit, the first to third reservoir chambers may communicate with each other by a partition a portion of which is open and the first reservoir chamber may be divided at a center of the reservoir by the partition and the second to third reservoir chambers may be divided at a side of the first reservoir chamber by the partition.

Also, the electronic brake system may further include a first reservoir flow channel configured to connect the actuator and the first reservoir chamber, wherein the first reservoir flow channel includes a fourth reservoir flow channel configured to supply brake fluid to the first chamber, a fifth reservoir flow channel configured to supply brake fluid to the second chamber, a sixth reservoir flow channel configured to draw brake fluid out from the first chamber, and a seventh reservoir flow channel configured to draw brake fluid out from the second chamber.

Also, the second reservoir flow channel that connects the second reservoir chamber and the first hydraulic circuit to each other may include first and second outlet flow channels branched to be connected to the two wheel cylinders, respectively, and the third reservoir flow channel that connects the third reservoir chamber and the second hydraulic circuit to each other may include third and fourth outlet flow channels branched to be connected to the two wheel cylinders, respectively.

Also, first to fourth inlet valves configured to selectively may allow a two-way fluid flow may be installed at the first to fourth inlet flow channels, respectively, and first to fourth outlet valves configured to selectively may allow a two-way fluid flow may be installed at the first to fourth outlet flow channels, respectively.

Also, the first to fourth inlet valves and the first to fourth outlet valves may be normally open type valves that operate to be normally open and be closed when a closing signal is received.

Also, a first reservoir check valve configured to allow a fluid flow from the reservoir only toward the first chamber may be installed at the fourth reservoir flow channel, a second reservoir check valve configured to allow a fluid flow from the reservoir only toward the first chamber may be installed at the fifth reservoir flow channel, a third reservoir check valve configured to allow a fluid flow from the first chamber only toward the reservoir may be installed at the sixth reservoir flow channel, and a fourth reservoir check valve configured to allow a fluid flow from the second chamber only toward the reservoir may be installed at the seventh reservoir flow channel, Also, a first reservoir solenoid valve configured to selectively may allow a two-way fluid flow is installed at the sixth reservoir flow channel, and a second reservoir solenoid valve configured to selectively may allow a two-way fluid flow is installed at the seventh reservoir flow channel.

Also, the first and second reservoir solenoid valves may be normally closed type valves that operate to be normally closed and be open when an open signal is received.

Advantageous Effects

According to embodiments of the present disclosure, a weight, a volume, and a manufacturing cost of an electronic brake system can be reduced by omitting a master cylinder.

In addition, a product can be miniaturized since a redundancy function is realized by using only a single driving unit.

In addition, an emergency can be more effectively dealt with by allowing valves and sensors to also satisfy a redundancy function.

In addition, noise and fluid leakage can be prevented and a manufacturing cost can be reduced by including a check valve and reducing the number of valves.

In addition, a hydraulic pressure can be provided more rapidly and boosting of the hydraulic pressure can be controlled more precisely by configuring an actuator piston of a hydraulic pressure supply device as a double-acting type.

DESCRIPTION OF DRAWINGS

These and/or other aspects of the disclosure will become apparent and more readily appreciated from the following description of the embodiments, taken in conjunction with the accompanying drawings of which.

MODES OF THE INVENTION

Figure 1:
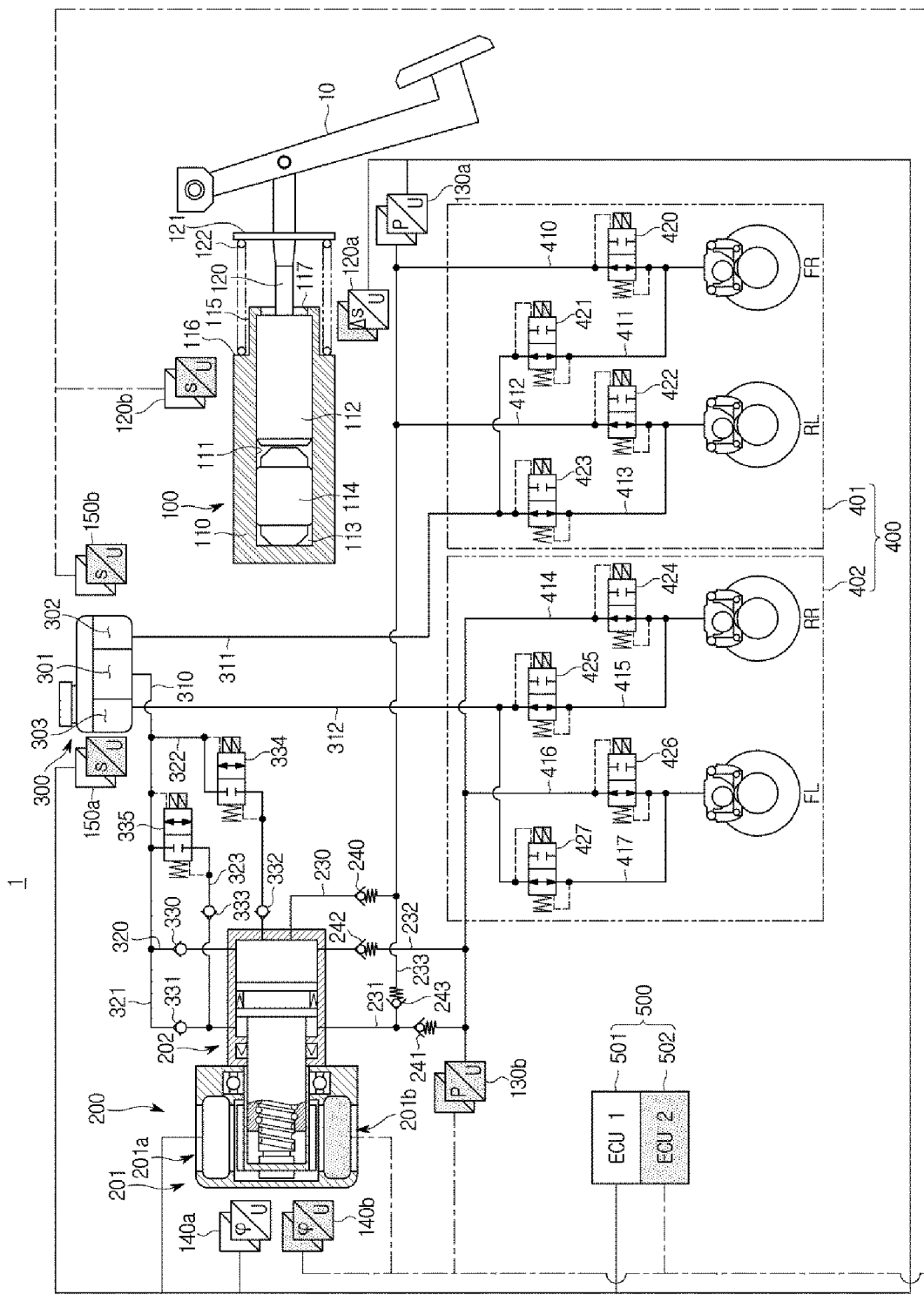
FIG. 1 is a diagram of a hydraulic pressure circuit illustrating an electronic brake system according to a first embodiment of the present disclosure.

Hereinafter, embodiments of the present disclosure will be described in detail with reference to the accompanying drawings. The below embodiments are presented to sufficiently convey the spirit of the present disclosure to those of ordinary skill in the art to which the present disclosure pertains. The present disclosure is not limited to the embodiments presented herein and may also be embodied in another form. In the drawings, parts unrelated to the description will be omitted to clarify the present disclosure, and sizes of elements may be somewhat exaggerated to assist in understanding the present disclosure.

FIG. 1 is a diagram of a hydraulic pressure circuit 400 illustrating an electronic brake system 1 according to a first embodiment of the present disclosure.

Referring to FIG. 1, the electronic brake system 1 has an actuator 200 that generates a hydraulic pressure, a reservoir 300 that is connected to the actuator 200 and stores a brake fluid, pedal displacement sensors 120a and 120b that detect a displacement of a brake pedal 10, a pedal simulator 100 that provides a reaction force according to a pedal force of the brake pedal 10, and wheel cylinders FR, FL, RR, and RL that receive a hydraulic pressure to perform braking of each wheel.

The pedal simulator 100 may be connected to the brake pedal 10 via an input rod 120. The input rod 120 may have one side connected to the brake pedal 10 to linearly move according to a displacement of the brake pedal 10. However, the input rod 120 may move slightly vertically since the input rod 120 is connected to a point spaced apart from a rotating shaft of the brake pedal 10.

In addition, the pedal simulator 100 may provide a reaction force according to a pedal force applied to the brake pedal 10 by a driver. Also, conversely, the pedal simulator 100 may provide a reaction force according to a force of the driver releasing the pedal force applied to the brake pedal 10.

As the reaction force is provided by a degree to which the pedal simulator 100 compensates for the pedal force or a force of releasing the pedal force, the driver may precisely control a brake force as intended.

The pedal simulator 100 includes a simulator block, a simulator cylinder 110 having a simulator bore 111 formed in the simulator block, a simulator piston 112 accommodated in the simulator bore 111 provided to be slidable and connected to the input rod 120 to move together with the input rod 120, a simulator chamber 113 formed between the simulator piston 112 and the simulator cylinder 110, and a simulator elastic member 114 accommodated in the simulator bore 111 to provide an elastic force to the simulator piston 112.

The simulator piston 112 may be guided by the simulator bore 111 to reciprocate. For example, the simulator piston 112 may be provided in a cylindrical shape.

In addition, the simulator piston 112 may be disposed to be pressed and move forward according to a displacement of the input rod 120. Also, the input rod 120 may come into contact with the simulator piston 112 to be adhered to the simulator piston 112. That is, there may be no gap between the simulator piston 112 and the input rod 120. Consequently, when the driver steps on the brake pedal 10, the driver may directly press the simulator piston 112 without a dead stroke section of the pedal.

The simulator cylinder 110 includes an opening 117 that communicates with the simulator bore 111 at the rear end portion thereof. In addition, the input rod 120 may be connected to the simulator piston 112 via the opening 117.

The simulator elastic member 114 may be interposed between a front portion of the simulator piston 112 and an inner wall of the simulator cylinder 110, i.e., in the simulator chamber 113. Also, the simulator elastic member 114 provides an elastic force to the simulator piston 112 by being elastically deformed by a forward movement of the simulator piston 112. In addition, the simulator elastic member 114 provides a restoration force to the simulator piston 112 by being elastically restored by a backward movement of the simulator piston 112.

The simulator elastic member 114 may be provided as a material such as rubber. Also, the shape of the simulator elastic member 114 may vary according to design.

Meanwhile, the shape of the simulator elastic member 114 illustrated in the drawings is merely an embodiment in which an elastic force may be provided to the simulator piston 112 and includes various embodiments by being deformed to store an elastic force. For example, the simulator elastic member 114 may include various members such as a coil spring and a plate spring capable of storing an elastic force.

In addition, the pedal simulator 100 may further include a pedal spring 122 interposed between the input rod 120 and the simulator cylinder 110.

The pedal spring 122 may be interposed between a front portion of the brake pedal 10 and a rear portion of the simulator cylinder 110. For example, the pedal spring 122 may be interposed between a first support part 121 provided behind the input rod 120 and a second support part 116 provided behind the simulator cylinder 110. Also, the pedal spring 122 may be provided as a coil spring.

In addition, the pedal spring 122 provides a restoration force to the brake pedal 10 by being elastically deformed as the brake pedal 10 moves forward and being elastically restored as the brake pedal 10 moves backward. The pedal spring 122 may provide the restoration force so that the brake pedal 10 is restored to its original position when the driver releases a pedal force that has been applied to the brake pedal 10.

In addition, a cylindrically-shaped spring guide unit 115 may protrude toward the input rod 120 from the rear end of the simulator cylinder 110. The spring guide unit 115 may be accommodated in the pedal spring 122 to guide the pedal spring 122. Also, the pedal spring 122 may be disposed along an outer circumference of the spring guide unit 115 and may be deformed by being guided by the spring guide unit 122.

In addition, the second support part 116 may be provided at an outer boundary of the spring guide unit 115. For example, the second support part 116 may be a stepped region between the simulator cylinder 110 and the spring guide unit 115.

In addition, the pedal simulator 100 may be separately provided from a device that supplies a brake pressure. For example, a brake pressure can only be supplied by the actuator 200, which will be described below, and a pedal force of the brake pedal 10 is only transmitted to the pedal simulator 100 and cannot directly generate the brake pressure.

Alternatively, a pedal force unit that connects the brake pedal 10 to the pedal simulator 100 and a hydraulic pressure unit that connects the actuator 200 to the wheel cylinders FR, FL, RR, and RL may be provided to be hydraulically separated from each other. Here, being hydraulically separated includes the pedal force of the brake pedal 10 not being directly connected to the wheel cylinders FR, FL, RR, and RL via the brake fluid.

Alternatively, the pedal force unit and the hydraulic pressure unit are provided to be mechanically separated from each other. Here, being mechanically separated includes power transmission by a mechanical element or power transmission by a hydraulic pressure not being performed between the pedal force unit and the hydraulic pressure unit. The pedal force unit and the hydraulic pressure unit are only electrically connected to each other via the pedal displacement sensors 120a and 120b and an electronic control unit (ECU 500).

However, the pedal force unit and the hydraulic pressure unit being provided to be mechanically separated from each other does not mean that the pedal force unit and the hydraulic pressure unit cannot be structurally coupled to each other to form one unit. That is, the pedal force unit and the hydraulic pressure unit may be configured as one unit to decrease weight and volume.

Figure 2:
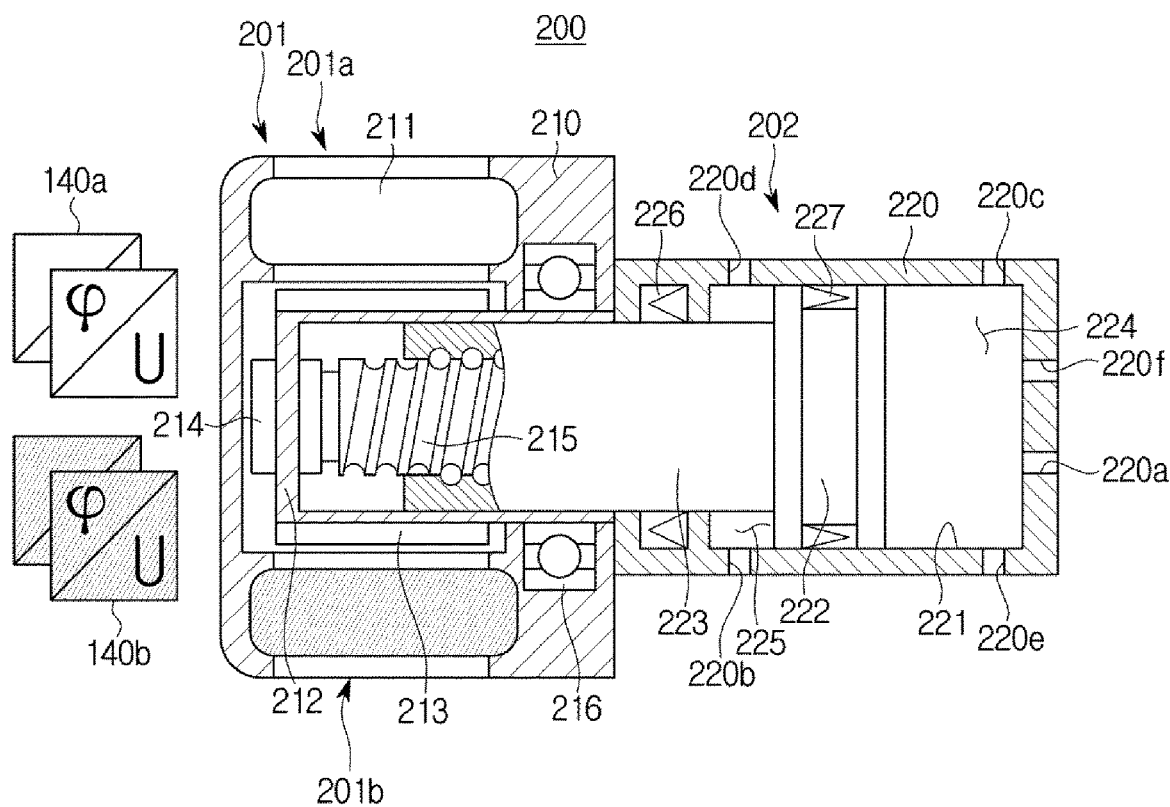
FIG. 2 is an enlarged view illustrating the actuator according to the first embodiment of the present disclosure.

FIG. 2 is an enlarged view illustrating the actuator 200 according to the first embodiment of the present disclosure.

Referring to FIG. 2, the actuator 200 includes a driving unit 201 and the actuator includes a piston cylinder unit 202 that is operated by power of the driving unit 201. The driving unit 201 generates power by electrical signals from the pedal displacement sensors 120a and 120b, and the piston cylinder unit 202 generates a hydraulic pressure by the power from the driving unit 201 to provide a brake pressure to the wheel cylinders FR, FL, RR, and RL.

The pedal displacement sensors 120a and 120b detect a displacement of the brake pedal 10 and transmit electrical signals to the ECU 500. In addition, the ECU 500 analyzes the signals from the pedal displacement sensors 120a and 120b to identify a brake pressure requested by the driver and outputs signals for controlling the piston cylinder unit 202 and various types of valves so that the brake pressure requested by the driver is satisfied.

The driving unit 201 includes a motor 210 that generates a rotary force by a supply of power. The motor 210 is a device that generates a rotary force by signals output from the ECU 500, and may generate the rotary force in a forward direction or a backward direction. An angular speed and an angle of rotation of the motor 210 may be precisely controlled. Since the motor 210 is an already well-known technology, a detailed description thereof will be omitted.

The motor 210 includes a stator 211 and a rotor 212. The stator 211 may be provided in a ring shape or a donut shape that forms a hollow, and the rotor 212 may be disposed in the hollow of the stator 211 and provided in a hollow cylindrical shape.

In addition, the driving unit 201 includes at least one magnetic body 213 that generates the rotary force of the motor 210. The at least one magnetic body 213 may be disposed at an outer circumferential surface of the rotor 212 and rotate together with the rotor 212. Also, a gap may be formed between the stator 211 and the at least one magnetic body 213 so that the rotor 212 may rotate without interference.

In addition, the driving unit 201 may further include a ball bearing 216 interposed between the motor 210 and the rotor 212. The ball bearing 216 may be installed at an inner circumferential surface of the hollow of the motor 210 and guide the rotation of the rotor 212.

In addition, the driving unit 201 includes a power transmission unit that converts the rotary movement of the motor 210 into a linear movement and transmits the linear movement force to an actuator piston 222. The power transmission unit may include a pin member 214 that is coupled to the rotor 212 to rotate together with the rotor 212, and a rotating shaft member 215 that rotates by being connected to the pin member 214. For example, the rotor 212 may have a surface formed at one end portion while being provided in the hollow cylindrical shape, and the pin member 214 may be coupled to the end surface of the rotor 212.

The piston cylinder unit 202 may include an actuator cylinder, an actuator cylinder 220 having a bore 221 formed in the cylinder block, a piston rod 223 that is coupled to the rotating shaft member 215 by a gear to linearly reciprocate, the actuator piston 222 connected to the piston rod 223 and accommodated in the bore 221 to be provided to be slidable, and chambers 224 and 225 formed between the actuator piston 222 and the actuator cylinder 220.

The actuator cylinder 220 may be connected to one side of the motor 210. Alternatively, the actuator cylinder 220 may also be integrally formed with the motor 210. The actuator cylinder 220 forms the bore 221 which is a hollow that accommodates the actuator piston 222.

In addition, the bore 221 may extend in a direction parallel to that of the rotating shaft of the motor 210. That is, the actuator piston 222 may linearly reciprocate in the direction parallel to that of the rotating shaft of the motor 210.

The piston rod 223 may be a nut member that is coupled to the rotating shaft member 215 by a screw. For example, a screw with threads may be formed at an outer circumferential surface of the rotating shaft member 215, and a screw groove that is coupled to the screw of the rotating shaft member 215 may be formed at an inner circumferential surface of the piston rod 223. That is, the rotary movement of the rotating shaft member 215 may be converted into a linear reciprocating movement of the piston rod 223.

Meanwhile, the rotating shaft member 215 and the piston rod 223 may be coupled to each other by a rolling ball interposed between the threads and the screw groove.

In addition, one side of the actuator cylinder 220 is open to communicate with the bore 221. Also, the piston rod 223 may pass through and enter the opening of the actuator cylinder 220.

In addition, an inner diameter of the opening of the actuator cylinder 220 may be smaller than that of the bore 221, and an outer diameter of the actuator piston 222 may be larger than that of the piston rod 223. Consequently, the actuator piston 222 may be prevented from leaving the bore 221.

The piston cylinder unit 202 may be provided as a double-acting type piston. That is, the piston cylinder unit 202 may include a first chamber 224 disposed in front of the actuator piston 222 and a second chamber 225 disposed behind the actuator piston 222.

Each of the first chamber 224 and the second chamber 225 may be connected to one or more of the wheel cylinders FR, FL, RR, and RL to provide a hydraulic pressure. The hydraulic pressure formed in the first chamber 224 may be transferred to one or more of the wheel cylinders FR, FL, RR, and RL via a first hydraulic pressure flow channel 230 as the actuator piston 222 moves forward, and the hydraulic pressure formed in the second chamber 225 may be transferred to one or more of the wheel cylinders FR, FL, RR, and RL via a second hydraulic pressure flow channel 231 as the actuator piston 222 moves backward.

In addition, the first chamber 224 and the second chamber 225 may be connected to one or more of the wheel cylinders FR, FL, RR, and RL to relieve a hydraulic pressure. The brake fluid of the wheel cylinders FR, FL, RR, and RL may be introduced into the first chamber 224 via the first hydraulic pressure flow channel 230 by a negative pressure formed in the first chamber 224 as the actuator piston 222 moves forward, and the brake fluid of the wheel cylinders FR, FL, RR, and RL may be introduced into the second chamber 225 via the second hydraulic pressure flow channel 231 by a negative pressure formed in the second chamber 225 as the actuator piston 222 moves backward.

Meanwhile, when the actuator piston 222 moves forward, a hydraulic pressure may be generated in the first chamber 224 or a negative pressure may be generated in the second chamber 225. Conversely, when the actuator piston 222 moves backward, a negative pressure may be generated in the first chamber 224 or a hydraulic pressure may be generated in the second chamber 225. Here, whether to provide a brake pressure to the wheel cylinders FR, FL, RR, and RL using a hydraulic pressure in a chamber or relieve the brake pressure using a negative pressure in a chamber may be determined since the ECU 500 controls valves.

The first chamber 224 is partitioned by the actuator cylinder 220 and a front end of the actuator piston 222 and is provided to have its volume changed according to a movement of the actuator piston 222. The second chamber 225 is partitioned by the actuator cylinder 220 and a rear end of the actuator piston 222 and is provided to have its volume changed according to the movement of the actuator piston 222.

In addition, the actuator piston 222 may be provided so that a first effective area in which a hydraulic pressure is formed in the first chamber 224 is larger than a second effective area in which a hydraulic pressure is formed in the second chamber 225. That is, the second effective area may be a value resulting from subtracting a cross-sectional area of the piston rod 223 from a cross-sectional area of the actuator piston 222.

In addition, the piston cylinder unit 202 may further include a first sealing member 226 that prevents a brake fluid in the second chamber 225 from leaking along the piston rod 223. The first sealing member 226 may be installed at an inner circumferential surface of the opening of the actuator cylinder 220. For example, a ring-shaped recessed groove may be provided at the inner circumferential surface of the opening of the actuator cylinder 220, and the ring-shaped first sealing member 226 may be fitted into the recessed groove.

In addition, the piston cylinder unit 202 may further include a second sealing member 227 that seals the first chamber 224 and the second chamber 225. The second sealing member 227 may be installed at an outer circumferential surface of the actuator piston 222 and move together with the actuator piston 222. Two flange shapes may be provided at the front end and the rear end of the actuator piston 222, respectively, and the ring-shaped second sealing member 227 may be fitted between the two flange shapes.

That is, the hydraulic pressure or the negative pressure in the first chamber 224 generated by a forward or backward movement of the actuator piston 222 may be blocked by the second sealing member 227 and prevented from leaking to the second chamber 225, and the hydraulic pressure or the negative pressure in the second chamber 225 generated by the forward or backward movement of the actuator piston 222 may be blocked by the first sealing member 226 and prevented from leaking out of the actuator cylinder 220.

The actuator cylinder 220 may include a first communication hole 220a that communicates with the first hydraulic pressure flow channel 230 connected to the first chamber 224 and a first hydraulic pressure circuit 401, and a second communication hole 220b that communicates with the second hydraulic pressure flow channel 231 connected to the second chamber 225 and a second hydraulic pressure circuit 402.

In addition, the actuator cylinder 220 may further include a third communication hole 220c that communicates with a fourth reservoir flow channel 320 connected to the first chamber 224 and a first reservoir chamber 301, and a fourth communication hole 220d that communicates with a fifth reservoir flow channel 321 connected to the second chamber 225 and the first reservoir chamber 301.

In addition, the actuator cylinder 220 may further include a fifth communication hole 220e that communicates with the first chamber 224 and the second hydraulic pressure flow channel 231.

In addition, the actuator cylinder 220 may further include a sixth communication hole 220f that communicates with the first chamber 224 and a sixth reservoir flow channel 322.

In addition, referring again to FIG. 1, the electronic brake system 1 may include the reservoir 300 connected to the actuator 200 and configured to store a brake fluid. The reservoir 300 may include three reservoir chambers 301, 302, and 303.

The reservoir chambers 301, 302, and 303 abutting each other may be divided by partitions. For example, the first reservoir chamber 301 and a second reservoir chamber 302 may be divided by a first partition, and the second reservoir chamber 302 and a third reservoir chamber 303 may be divided by a second partition.

Portions of the first partition and the second partition may be open so that the first to third reservoir chambers 301, 302, and 303 communicate with each other. Consequently, pressures in the first to third reservoir chambers 301, 302, and 303 may be the same. For example, the pressures in the first to third reservoir chambers 301, 302, and 303 may all be the same atmospheric pressure.

The first reservoir chamber 301 is may be divided at a center of the reservoir 300 by the first and second partition. Also, the second reservoir chamber 302 may be divided at one side of the reservoir 300 by the first partition and a side wall of the reservoir 300, and third reservoir chamber 303 may be divided at another side of the reservoir 300 by the second partition and the side wall of the reservoir 300. The first reservoir chamber 301 may be connected to the actuator 200 via a first reservoir flow channel 310. Also, the first reservoir flow channel 310 may include the fourth reservoir flow channel 320 that supplies a brake fluid to the first chamber 224 of the actuator 200 and the fifth reservoir flow channel 321 that supplies a brake fluid to the second chamber 225. Alternatively, the first reservoir flow channel 310 may be branched into the fourth reservoir flow channel 320 and the fifth reservoir flow channel 321.

In addition, a first reservoir check valve 330 that allows the brake fluid from to the first reservoir chamber 301 to flow only toward the first chamber 224 may be installed in the fourth reservoir flow channel 320, and a second reservoir check valve 331 that allows the brake fluid from the first reservoir chamber 301 to flow only toward the second chamber 225 may be installed in the fifth reservoir flow channel 321.

In addition, the first reservoir flow channel 310 may include the sixth reservoir flow channel 322 through which the brake fluid in the first chamber 224 of the actuator 200 moves to the first reservoir chamber 301, and a seventh reservoir flow channel 323 through which the brake fluid in the second chamber 225 moves to the first reservoir chamber 301. Alternatively, the first reservoir flow channel 310 may be branched into the sixth reservoir flow channel 322 and the seventh reservoir flow channel 323.

In addition, a third reservoir check valve 332 that allows the brake fluid from the first chamber 224 to flow only toward the first reservoir chamber 301 may be installed in the sixth reservoir flow channel 322, and a fourth reservoir check valve 333 that allows the brake fluid from the second chamber 225 to flow only toward the first reservoir chamber 301 may be installed in the seventh reservoir flow channel 323.

In addition, a first reservoir solenoid valve 334 that selectively allows a two-way flow of a brake fluid between the first reservoir chamber 301 and the first chamber 224 may be installed in the sixth reservoir flow channel 322, and a second reservoir solenoid valve 335 that selectively allows a two-way flow of a brake fluid between the first reservoir chamber 301 and the second chamber 225 may be installed in the seventh reservoir flow channel 323.

In addition, the first reservoir solenoid valve 334 may be disposed between the third reservoir check valve 332 and the first reservoir chamber 301, and may be provided as a normally closed type valve that is normally closed and is operated to open when an opening signal is received from the ECU 500.

In addition, the second reservoir solenoid valve 335 may be disposed between the fourth reservoir check valve 333 and the first reservoir chamber 301, and may be provided as a normally closed type valve that is normally closed and is operated to open when an opening signal is received from the ECU 500.

In addition, the second reservoir chamber 302 may be connected to two of the four wheel cylinders, e.g., the wheel cylinders FR and RL respectively provided at a front-right wheel and a rear-left wheel, via a second reservoir flow channel 311. The connection between the second reservoir chamber 302 and the wheel cylinders FR and RL may be controlled by first and second outlet valves 421 and 423.

In addition, the third reservoir chamber 303 may be connected to the other two of the four wheel cylinders, e.g., the wheel cylinders RR and FL respectively provided at a rear-right wheel and a front-left wheel, via a third reservoir flow channel 312. The connection between the third reservoir chamber 303 and the wheel cylinders RR and FL may be controlled by third and fourth outlet valves 425 and 427.

In the reservoir 300 according to an embodiment of the present disclosure, the first reservoir chamber 301 connected to the actuator 200 may be separately provided from the second and third reservoir chambers 302 and 303 connected to the wheel cylinders FR, RL, RR, and FL. When a reservoir chamber supplying oil to the actuator 200 and a reservoir chamber supplying oil to the wheel cylinders FR, RL, RR, and FL are the same, the brake fluid in the reservoir 300 may be insufficient and oil may not be adequately supplied to the actuator 200. As a result, a brake force intended by the driver may not be sufficiently provided.

However, since the first reservoir chamber 301 is separately provided from the second and third reservoir chambers 302 and 303 in the reservoir 300 according to the embodiment of the present disclosure, an amount of the brake fluid supplied to the actuator 200 may be secured.

Further, the first reservoir chamber 301 connected to the actuator 200 may be provided at the center of the reservoir 300 and the second and third reservoir chambers 302 and 303 connected to the wheel cylinder may be provided at the side of the first reservoir chamber 301, so that when the supply amount of the brake fluid introduced into the second or third reservoir chamber 302 or 303 from the wheel cylinder becomes larger than the volume of the second or third reservoir chamber 302 or 303, the braking fluid may be introduced into the first reservoir chamber 301 at the central portion through the open portion of the first partition or the second partition, therefore the supply of the braking fluid between the first reservoir chamber 301 and the actuator 200 may be smooth.

In addition, in the reservoir 300, the first reservoir flow channel 310 connecting the actuator 200 to the reservoir 300 may be separately provided from the second and third reservoir flow channels 311 and 312 connecting the wheel cylinders FR, RL, RR, and FL to the reservoir 300.

Consequently, when braking is performed using an antilock braking system (ABS), a decrease in performance of the ABS may be prevented by preventing bubbles that may be generated in the second and third reservoir flow channels 311 and 312 from being introduced into the first and second chambers 224 and 225 of the actuator 200.

In addition, the electronic brake system 1 may include the hydraulic pressure circuit 400 formed with the first and second hydraulic pressure circuits 401 and 402 each configured to control a flow of a hydraulic pressure transferred to any two of the wheel cylinders FR, FL, RR, and RL at two wheels, and the ECU 500 that controls the actuator 200 and the valves based on hydraulic pressure information and pedal displacement information.

The hydraulic pressure circuit 400 may be formed with the first hydraulic pressure circuit 401 and the second hydraulic pressure circuit 402, each of which controls two wheels by receiving a hydraulic pressure. In addition, the wheel cylinders FR, FL, RR, and RL are installed at respective wheels to receive a hydraulic pressure for braking. For example, the first hydraulic pressure circuit 401 may control the wheel cylinder FR at the front-right wheel and the wheel cylinder RL at the rear-left wheel, and the second hydraulic pressure circuit 402 may control the wheel cylinder FL at the front-left wheel and the wheel cylinder RR at the rear-right wheel.

The first hydraulic pressure circuit 401 may be connected to the first hydraulic pressure flow channel 230 and receive a hydraulic pressure from the actuator 200. The first hydraulic pressure flow channel 230 is branched into two flow channels respectively connected to the wheel cylinder FR at the front-right wheel and the wheel cylinder RL at the rear-left wheel.

Likewise, the second hydraulic pressure circuit 402 may be connected to the second hydraulic pressure flow channel 231 and receive a hydraulic pressure from the actuator 200. The second hydraulic pressure flow channel 231 is branched into two flow channels respectively connected to the wheel cylinder FL at the front-left wheel and the wheel cylinder RR at the rear-right wheel.

In addition, the first chamber 224 may be connected to the second hydraulic pressure circuit 402 via a third hydraulic pressure flow channel 232. Also, the second chamber 225 may be connected to the first hydraulic pressure circuit 401 via a fourth hydraulic pressure flow channel 233. Here, the third hydraulic pressure flow channel 232 may be branched from a first hydraulic pressure flow channel 230 or may independently communicate with the first chamber 224. Also, the fourth hydraulic pressure flow channel 233 may be branched from a second hydraulic pressure flow channel 231 or may independently communicate with the second chamber 225.

In addition, the first and second hydraulic pressure circuits 401 and 402 may include a plurality of inlet valves 420, 422, 424, and 426 and the outlet valves 421, 423, 425, and 427 to control a flow of a hydraulic pressure when braking and releasing braking are performed.

The inlet valves 420, 422, 424, and 426 are each provided at a flow channel that connects the actuator 200 to one of the wheel cylinders FR, FL, RR, and RL to control a hydraulic pressure being provided to the wheel cylinders FR, FL, RR, and RL at each wheel when braking is performed. That is, the inlet valves 420, 422, 424, and 426 may detect brake pressures requested by the wheel cylinders FR, FL, RR, and RL at each wheel and may be selectively opened to control the pressure when braking is required.

In addition, the outlet valves are each provided at a flow channel that connects the reservoir 300 to one of the wheel cylinders FR, FL, RR, and RL to control the hydraulic pressure being discharged from each wheel when releasing braking is performed. That is, the outlet valves 421, 423, 425, and 427 may detect the brake pressure at each wheel and may be opened to control the pressure when braking with a reduced pressure is required.

In the first hydraulic pressure circuit 401, first and second inlet valves 420 and 422 may be respectively installed at a first inlet flow channel 410 and a second inlet flow channel 412 branched from a first hydraulic pressure flow channel 230 to control a hydraulic pressure being transferred to the wheel cylinders FR and RL. In addition, in the second hydraulic pressure circuit 402, third and fourth inlet valves 424 and 426 may be respectively installed at a third inlet flow channel 414 and a fourth inlet flow channel 416 branched from a second hydraulic pressure flow channel 231 to control a hydraulic pressure being transferred to the wheel cylinders FL and RR.

In addition, the inlet valves 420, 422, 424, and 426 may be disposed at upstream sides of the wheel cylinders FR, FL, RR, and RL and may be provided as normally open type solenoid valves that are normally open and operate to be closed when a closing signal is received from the ECU 500.

In addition, in the first hydraulic pressure circuit 401, the first and second outlet valves 421 and 423 may be respectively installed at a first outlet flow channel 411 and a second outlet flow channel 413 branched from the second reservoir flow channel 311 and configured to connect downstream sides of the first and second inlet valves 420 and 422 to the reservoir 300 to control a hydraulic pressure discharged from the wheel cylinders FR and RL.

In addition, in the second hydraulic pressure circuit 402, the third and fourth outlet valves 425 and 427 may be respectively installed at a third outlet flow channel 415 and a fourth outlet flow channel 417 branched from the third reservoir flow channel 312 and configured to connect downstream sides of the third and fourth inlet valves 424 and 426 to the reservoir 300 to control a hydraulic pressure discharged from the wheel cylinders FL and RR.

In addition, the outlet valves 421, 423, 425, and 427 may be disposed at the upstream sides of the wheel cylinders FR, FL, RR, and RL and may be provided as normally closed type solenoid valves that are normally closed and operate to be opened when an opening signal is received from the ECU 500.

In addition, the electronic brake system 1 according to the first embodiment of the present disclosure may further include circuit hydraulic pressure sensors 130*a* and 130*b* that detect a hydraulic pressure of the hydraulic pressure circuit 400. For example, the circuit hydraulic pressure sensors may include a first circuit hydraulic pressure sensor 130*a* that detects a hydraulic pressure by being connected to the first hydraulic pressure flow channel 230 and a second circuit hydraulic pressure sensor 130*b* that detects a hydraulic pressure by being connected to the second hydraulic pressure flow channel 231.

In addition, the electronic brake system 1 according to the first embodiment of the present disclosure may further include driving displacement sensors 140*a* and 140*b* that detect a displacement of the driving unit 201. For example, the driving displacement sensors 140*a* and 140*b* may detect a rotational angle of the motor 210. Alternatively, the driving displacement sensors 140*a* and 140*b* may detect any one of current, voltage, and torque of the driving unit 201.

In addition, the electronic brake system 1 according to the first embodiment of the present disclosure may further include reservoir displacement sensors 150*a* and 150*b* that detects a fluid level in the reservoir 300.

Meanwhile, the electronic brake system 1 according to the first embodiment of the present disclosure may have a redundancy function.

For this, the driving unit 201 may include a first driving unit 201*a* or a first power net and a second driving unit 201*b* or a second power net. The first driving unit 201*a* and the second driving unit 201*b* may be separately provided or integrally provided. For example, the first driving unit 201*a* and the second driving unit 201*b* may be stators 211 of the motor 210 that operate by mutually independent signals.

In addition, the ECU 500 may include a first electronic control unit (ECU1 501) connected to the first driving unit 201*a* or the first power net and a second electronic control unit (ECU2 502) connected to the second driving unit 201*b* or the second power net. The second driving unit 201*b* or the second power net may be provided to selectively operate or operate together with the first driving unit 201*a* or the first power net.

When the second driving unit 201*b* or the second power net is provided to selectively operate with respect to the first driving unit 201*a* or the first power net, the second driving unit 201*b* or the second power net may operate by a signal from the ECU2 502 even when the ECU1 501 operates abnormally, and the operation of the driving unit 201 may not be stopped. Alternatively, conversely, the first driving unit 201*a* or the first power net may operate by a signal from the ECU1 501 even when the ECU2 502 operates abnormally, and the operation of the driving unit 201 may not be stopped.

In addition, a central ECU 500 may block a signal from the ECU1 501 and allow the second driving unit 201*b* or the second power net to operate by a signal from the ECU2 502 when the ECU1 501 operates abnormally to prevent an abnormal operation of the driving unit 201. Alternatively, conversely, the central ECU 500 may block a signal from the ECU2 502 and allow the first driving unit 201*a* or the first power net to operate by a signal from the ECU1 501 when the ECU2 502 operates abnormally to prevent an abnormal operation of the driving unit 201.

In addition, one or more of the electronic valves controlled by the ECU 500 may include two coils which are respectively connected to the ECU1 501 and ECU2 502. Also, one of the two coils may be provided to operate by the ECU2 502 when the ECU1 501 operates abnormally, and the other one may be provided to operate by the ECU1 501 when the ECU2 502 operates abnormally.

In addition, one or more of the circuit hydraulic pressure sensors 130*a* and 130*b*, the driving displacement sensors 140*a* and 140*b*, and the reservoir displacement sensor 150 may include two sensors which are respectively connected to the ECU1 501 and ECU2 502. Also, any one of the two sensors may be provided to operate by the ECU2 502 when the ECU1 501 operates abnormally, and the other one may be provided to operate by the ECU1 501 when the ECU2 502 operates abnormally.

Consequently, the electronic brake system 1 according to the first embodiment of the present disclosure may perform a redundancy function since redundant parts are provided.

Generally, to form a minimum brake pressure even in a case of an abnormal operation, a master cylinder is hydraulically connected to a wheel cylinder in the electronic brake system 1. That is, in a case of a fallback mode, a cut valve is open to allow a hydraulic pressure of the master cylinder to be immediately introduced to the wheel cylinder to form a brake pressure.

However, the electronic brake system 1 according to the first embodiment of the present disclosure may perform a normal braking function when the ECU 500, the actuator, or the like operates abnormally even without a master cylinder. That is, by omitting the master cylinder, the number of parts, a weight, and a volume of the electronic brake system 1 may be reduced. In addition, by omitting the master cylinder, flow channels may be simplified and noise may be reduced. Also, an identical brake pressure to that formed in normal operation may be formed even when in the fallback mode.

Figure 3:
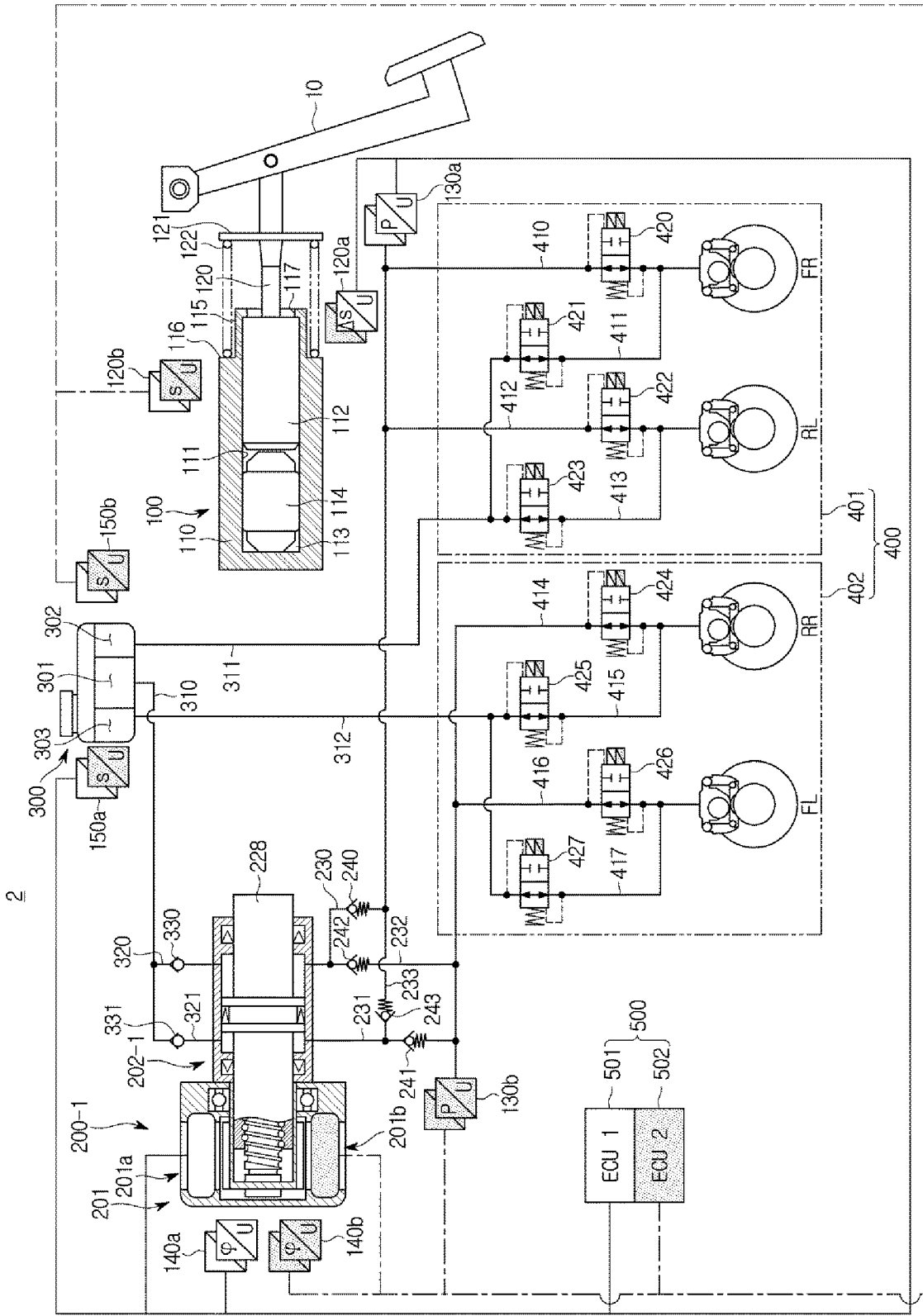
FIG. 3 is a hydraulic pressure circuit diagram illustrating an electronic brake system according to a second embodiment of the present disclosure.
Figure 4:
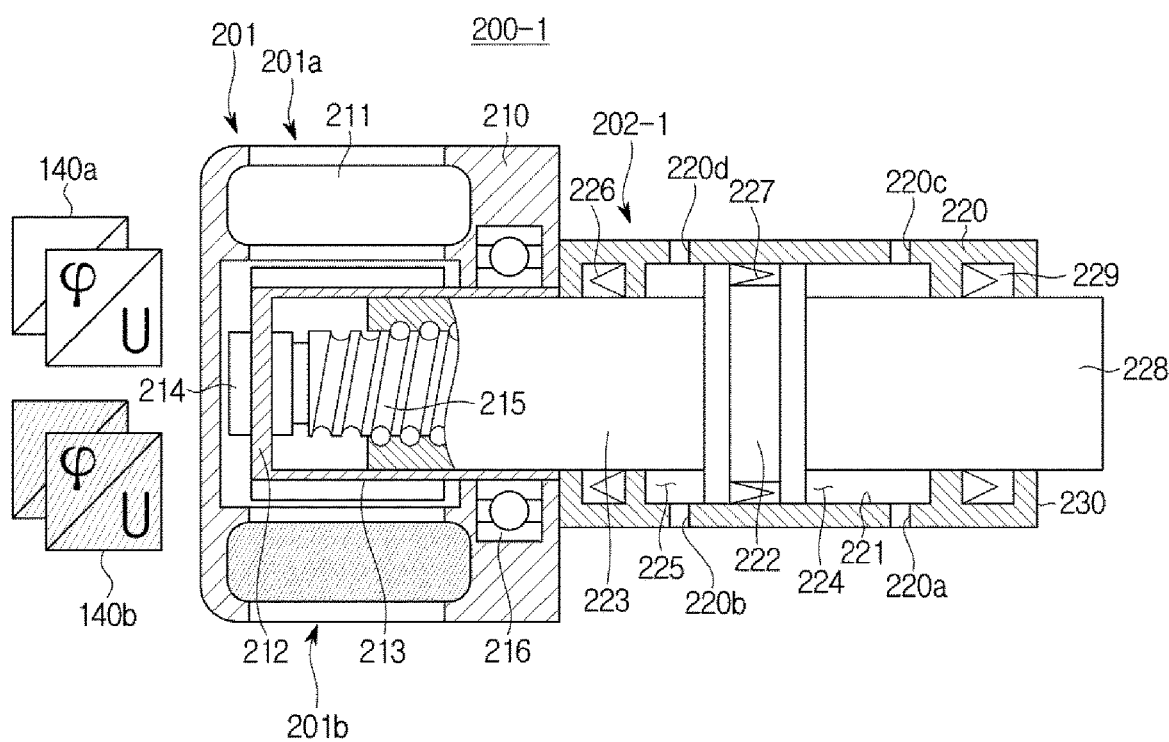
FIG. 4 is an enlarged view illustrating an actuator according to the second embodiment of the present disclosure.

FIG. 3 is a hydraulic pressure circuit diagram illustrating an electronic brake system 2 according to a second embodiment of the present disclosure, and FIG. 4 is an enlarged view illustrating an actuator 200-1 according to the second embodiment of the present disclosure.

In the actuator includes a piston cylinder unit 202-1 of the actuator 200-1 according to the second embodiment of the present disclosure, piston rods 223 and 228 are respectively connected to either side of the actuator piston 222.

Referring to FIG. 4, the first piston rod 223 coupled to the rotating shaft member 215 by a screw may extend toward the second chamber 225 at one side of the actuator piston 222, and a second piston rod 228 that passes through the actuator cylinder 220 may extend toward the first chamber 224 at the other side of the actuator piston 222.

A first opening that communicates with the bore 221 accommodating the actuator piston 222 and has the first piston rod 223 passing therethrough and a second opening that communicates with the bore 221 and has the second piston rod 228 passing therethrough are formed in the actuator cylinder 220.

In addition, the actuator piston 222 may be provided so that a first effective area in which a hydraulic pressure is formed in the first chamber 224 is the same as a second effective area in which a hydraulic pressure is formed in the second chamber 225. That is, the cross-sectional area of the first piston rod 223 may be the same as a cross-sectional area of the second piston rod 228.

In addition, the piston cylinder unit 202-1 may further include a third sealing member 229 that prevents the brake fluid in the first chamber 224 from leaking out of the actuator cylinder 220 along the second piston rod 228. The third sealing member 229 may be installed at an inner circumferential surface of the second opening of the actuator cylinder 220. For example, a ring-shaped recessed groove may be provided at the inner circumferential surface of the second opening of the actuator cylinder 220, and the ring shaped third sealing member 229 may be fit into the recessed groove.

Figure 5:
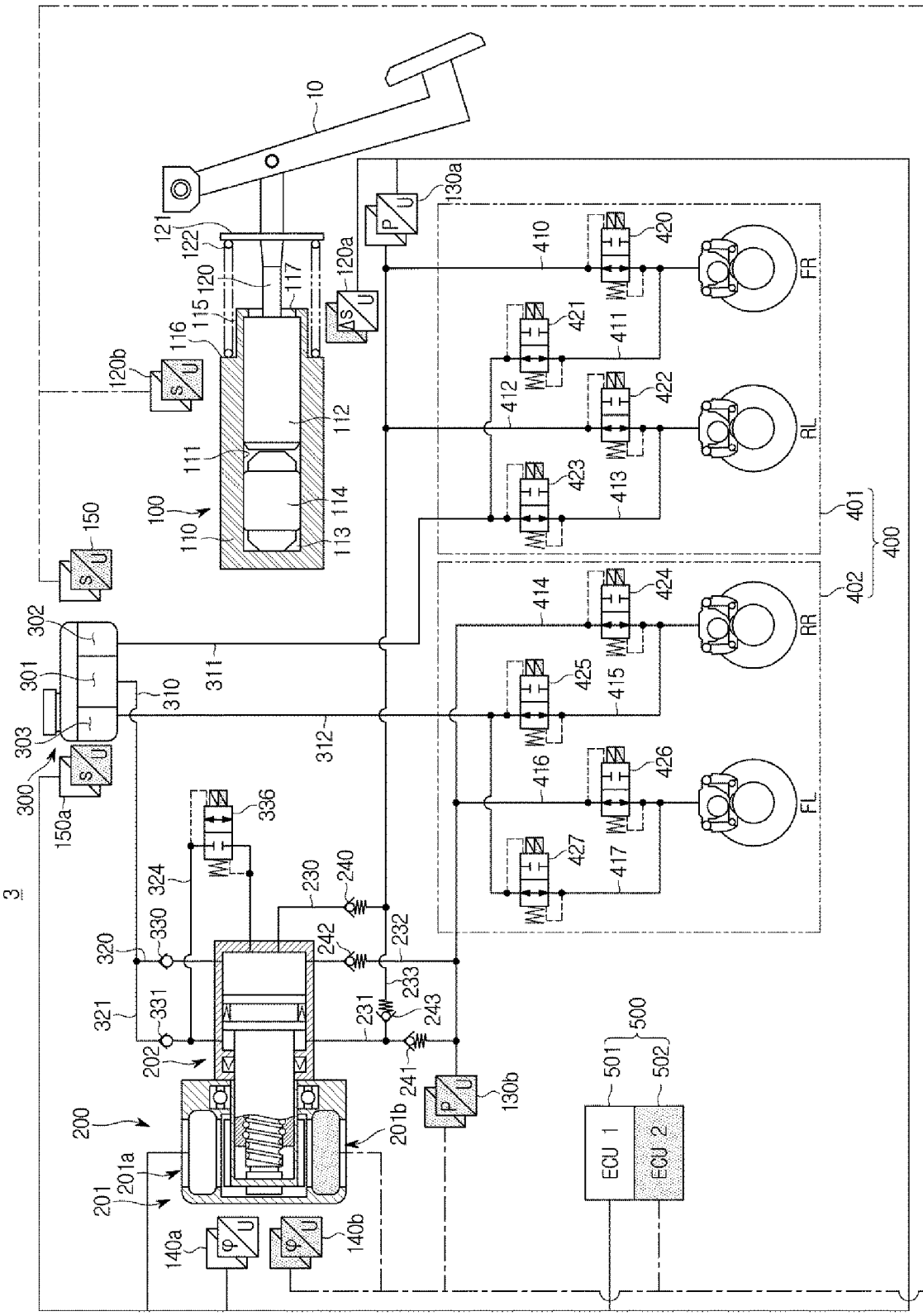
FIG. 5 is a hydraulic pressure circuit diagram illustrating an electronic brake system according to a third embodiment of the present disclosure.

FIG. 5 is a hydraulic pressure circuit diagram illustrating an electronic brake system 3 according to a third embodiment of the present disclosure.

The electronic brake system 3 according to the third embodiment of the present disclosure may further include a balance flow channel 324 that communicates with the first chamber 224 and the second chamber 225, and a balance valve 336 installed at the balance flow channel 324.

The balance valve 336 may be a solenoid valve that selectively allows a two-way flow of a brake fluid between the first chamber 224 and the second chamber 225. In addition, the balance valve 336 may be provided as a normally closed type solenoid valve that is normally closed and is operated to be open when an opening signal is received from the ECU 500.

Alternatively, the balance valve 336 may be provided as a normally open type solenoid valve that is normally open and is operated to be closed when a closing signal is received from the ECU 500.

Pressures in the first chamber 224 and the second chamber 225 may equalized by the balance flow channel 324 and the balance valve 336. That is, the balance valve 336 may be opened while the pressures in the first chamber 224 and the second chamber 225 are not uniform to perform a pressure equalization operation of the first chamber 224 and the second chamber 225.

| [Description of reference numerals] | |
|---|---|
| 1: Electronic brake system | 10: Brake pedal |
| 100: Pedal simulator | 110: Simulator block |
| 111: Simulator bore | 112: Simulator piston |
| 113: Simulator chamber | 114: Simulator elastic member |
| 115: Spring guide unit | 116: Second support part |
| 117: Opening | 120: Input rod |
| 120a, 120b: Pedal displacement sensor | 121: First support part |
| 122: Pedal spring | 130a, 130b: Circuit hydraulic pressure sensor |
| 140a, 140b: Driving displacement sensor | 150: Reservoir displacement sensor |
| 200: Actuator | 201: Driving unit |
| 201a: First driving unit | 201b: Second driving unit |
| 202: Piston cylinder unit | 210: Motor |
| 211: Stator | 212: Rotor |
| 213: Magnetic body | 214: Pin member |
| 215: Rotating shaft member | 216: Ball bearing |
| 220: Actuator cylinder | 221: Bore |
| 222: Actuator piston | 223: Piston rod |
| 224: First chamber | 225: Second chamber |
| 226: First sealing member | 227: Second sealing member |
| 228: Piston rod | 229: Third sealing member |
| 230: First hydraulic pressure flow channel | |
| 231: Second hydraulic pressure flow channel | |
| 232: Third hydraulic pressure flow channel | |
| 233: Fourth hydraulic pressure flow channel | |
| 240: First brake check valve | 241: Second brake check valve |
| 242: Third brake check valve | 243: Fourth brake check valve |
| 300: Reservoir | 301: First reservoir chamber |

| [Description of reference numerals] | |
|---|---|
| 302: Second reservoir chamber | 303: Third reservoir chamber |
| 310: First reservoir flow channel | 311: Second reservoir flow channel |
| 312: Third reservoir flow channel | 320: Fourth reservoir flow channel |
| 321: Fifth reservoir flow channel | 322: Sixth reservoir flow channel |
| 323: Seventh reservoir flow channel | 324: Balance flow channel |
| 330: First reservoir check valve | 331: Second reservoir check valve |
| 332: Third reservoir check valve | 333: Fourth reservoir check valve |
| 334: First reservoir solenoid valve | 335: Second reservoir solenoid valve |
| 336: Balance valve | |
| 400: Hydraulic pressure circuit | 401: First hydraulic pressure circuit |
| 402: Second hydraulic pressure circuit | 410: First inlet flow channel |
| 411: First outlet flow channel | 412: Second inlet flow channel |
| 413: Second outlet flow channel | 414: Third inlet flow channel |
| 415: Third outlet flow channel | 416: Fourth inlet flow channel |
| 417: Fourth outlet flow channel | 420: First inlet valve |
| 421: First outlet valve | 422: Second inlet valve |
| 423: Second outlet valve | 424: Third inlet valve |
| 425: Third outlet valve | 426: Fourth inlet valve |
| 427: Fourth outlet valve | 500: Electronic control unit (ECU) |
| 501: First electronic control unit (ECU1) | 502: Second electronic control unit (ECU2) |

The invention claimed is:

1. An electronic brake system including:

a pedal simulator configured to provide a reaction force according to a pedal force of a brake pedal;

an actuator configured to generate a hydraulic pressure using an actuator piston that operates by an electrical signal output corresponding to a displacement of the brake pedal, and including a first chamber provided at one side of the actuator piston movably accommodated in an actuator cylinder and connected to one or more wheel cylinders and a second chamber provided at the other side of the actuator piston and connected to one or more wheel cylinders;

a first hydraulic circuit including first and second inlet flow channels branched from a first hydraulic flow channel configured to communicate with the first chamber to be connected to two wheel cylinders, respectively;

a second hydraulic circuit including third and fourth inlet flow channels branched from a second hydraulic flow channel configured to communicate with the second chamber to be connected to two wheel cylinders, respectively; and a reservoir connected to the actuator and the first and second hydraulic circuits and configured to store brake fluid, wherein a hydraulic pressure unit connected from the actuator to the one or more wheel cylinders are hydraulically permanently separated from a pedal force unit connected from the brake pedal to the pedal simulator.

2. An electronic brake system including:

a pedal simulator configured to provide a reaction force according to a pedal force of a brake pedal;

an actuator configured to generate a hydraulic pressure using an actuator piston that operates by an electrical signal output corresponding to a displacement of the brake pedal, and including a first chamber provided at one side of the actuator piston movably accommodated in an actuator cylinder and connected to one or more wheel cylinders and a second chamber provided at the other side of the actuator piston and connected to one or more wheel cylinders;

a first hydraulic circuit including first and second inlet flow channels branched from a first hydraulic flow channel configured to communicate with the first chamber to be connected to two wheel cylinders, respectively;

a second hydraulic circuit including third and fourth inlet flow channels branched from a second hydraulic flow channel configured to communicate with the second chamber to be connected to two wheel cylinders, respectively;

a reservoir connected to the actuator and the first and second hydraulic circuits and configured to store brake fluid; and an electronic control unit for signal processing and controlling of the actuator and electrical valves, wherein a hydraulic pressure unit connected from the actuator to the one or more wheel cylinders are hydraulically separated from a pedal force unit connected from the brake pedal to the pedal simulator;

the actuator further includes a driving unit configured to generate a rotary force by power supplied thereto;

the driving unit includes a first driving unit and a second driving unit configured to selectively or together operate with the first driving unit; and the electronic control unit includes a first electronic control unit connected to the first driving unit and a second electronic control unit connected to the second driving unit.

3. The electronic brake system claim 2, wherein:

the driving unit is operated by the second electronic control unit when the first electronic control unit abnormally operates or is operated by the first electronic control unit when the second electronic control unit abnormally operates.

4. The electronic brake system of claim 3, wherein:

one or more of the electronic valves controlled by the electronic control unit include two coils respectively connected to the first and second electronic control units; and one of the two coils is operated by the second electronic control unit when the first electronic control unit operates abnormally, and the other one is operated by the first electronic control unit when the second electronic control unit operates abnormally.

5. The electronic brake system of claim 4, further including:
- a pedal displacement sensor configured to detect a displacement of the brake pedal;
- a circuit hydraulic sensor configured to detect a hydraulic pressure of the first or second hydraulic circuit; and
- a driving displacement sensor configured to detect an amount of rotation of the driving unit,
- wherein one or more of the pedal displacement sensor, the circuit hydraulic sensor, and the driving displacement sensor each include a main sensor and an auxiliary sensor, and the auxiliary sensor is a redundancy sensor provided to operate when the main sensor abnormally operates.

6. The electronic brake system of claim 3, wherein the first and second chambers are connected to each other with a balance valve.

7. The electronic brake system of claim 6, wherein the balance valve is a normally closed type valve that operates to be normally closed and be opened when an opening signal is received.

8. The electronic brake system of claim 3, further including:
- a third hydraulic flow channel configured to communicate with the first chamber and be connected to the second hydraulic circuit; and
- a fourth hydraulic flow channel configured to communicate with the second chamber and be connected to the first hydraulic circuit.

9. The electronic brake system of claim 8, wherein the first to fourth hydraulic flow channels respectively include first to fourth hydraulic check valves configured to allow a fluid flow from the actuator only toward the one or more wheel cylinders.

10. The electronic brake system of claim 3, wherein:
- the actuator includes a piston cylinder unit configured to operate on the power from the driving unit and including the actuator piston and the first and second chambers; and
- the driving unit includes a power transmission unit configured to convert the rotary force into straight-line motion of the actuator piston.

11. The electronic brake system of claim 10, wherein:
- the driving unit includes a motor including a stator and a rotor, and a rotation shaft member connected to the rotor to rotate together with the rotor;
- the rotor includes a hollow therein; and
- the rotation shaft member is disposed in the hollow of the rotor.

12. The electronic brake system of claim 3, wherein:
- the pedal simulator includes a simulator block including a simulator bore, a simulator piston configured to reciprocate in a straight line in the simulator bore, and a simulator elastic member disposed between the simulator piston in the simulator bore and the simulator block; and
- the simulator piston is connected to the brake pedal via an input rod.

13. An electronic brake system including:
- a pedal simulator configured to provide a reaction force according to a pedal force of a brake pedal;
- an actuator configured to generate a hydraulic pressure using an actuator piston that operates by an electrical signal output corresponding to a displacement of the brake pedal, and including a first chamber provided at one side of the actuator piston movably accommodated in an actuator cylinder and connected to one or more wheel cylinders and a second chamber provided at the other side of the actuator piston and connected to one or more wheel cylinders;
- a first hydraulic circuit including first and second inlet flow channels branched from a first hydraulic flow channel configured to communicate with the first chamber to be connected to two wheel cylinders, respectively;
- a second hydraulic circuit including third and fourth inlet flow channels branched from a second hydraulic flow channel configured to communicate with the second chamber to be connected to two wheel cylinders, respectively; and
- a reservoir connected to the actuator and the first and second hydraulic circuits and configured to store brake fluid,
- wherein a hydraulic pressure unit connected from the actuator to the one or more wheel cylinders are hydraulically separated from a pedal force unit connected from the brake pedal to the pedal simulator;
- the reservoir includes a first reservoir chamber configured to supply brake fluid to the actuator and receive brake fluid from the actuator, a second reservoir chamber configured to receive brake fluid from a first hydraulic circuit, and a third reservoir chamber configured to receive brake fluid from a second hydraulic circuit;
- the first to third reservoir chambers communicate with each other by a partition a portion of which is open: and
- the first reservoir chamber is divided at a center of the reservoir by the partition and the second to third reservoir chambers are divided at a side of the first reservoir chamber by the partition.

14. The electronic brake system of claim 13, further including a first reservoir flow channel configured to connect the actuator and the first reservoir chamber,
- wherein the first reservoir flow channel includes a fourth reservoir flow channel configured to supply brake fluid to the first chamber, a fifth reservoir flow channel configured to supply brake fluid to the second chamber, a sixth reservoir flow channel configured to draw brake fluid out from the first chamber, and a seventh reservoir flow channel configured to draw brake fluid out from the second chamber.

15. The electronic brake system of claim 14, wherein:
- a second reservoir flow channel that connects the second reservoir chamber and the first hydraulic circuit to each other includes first and second outlet flow channels branched to be connected to the two wheel cylinders, respectively; and
- a third reservoir flow channel that connects the third reservoir chamber and the second hydraulic circuit to each other includes third and fourth outlet flow channels branched to be connected to the two wheel cylinders, respectively.

16. The electronic brake system of claim 15, wherein:
- first to fourth inlet valves configured to selectively allow a two-way fluid flow are installed at the first to fourth inlet flow channels, respectively; and
- first to fourth outlet valves configured to selectively allow a two-way fluid flow are installed at the first to fourth outlet flow channels, respectively.

17. The electronic brake system of claim 16, wherein the first to fourth inlet valves and the first to fourth outlet valves are normally open type valves that operate to be normally open and be closed when a closing signal is received.

18. The electronic brake system of claim 14, wherein:
a first reservoir check valve configured to allow a fluid flow from the reservoir only toward the first chamber is installed at the fourth reservoir flow channel;
a second reservoir check valve configured to allow a fluid flow from the reservoir only toward the first chamber is installed at the fifth reservoir flow channel;
a third reservoir check valve configured to allow a fluid flow from the first chamber only toward the reservoir is installed at the sixth reservoir flow channel; and
a fourth reservoir check valve configured to allow a fluid flow from the second chamber only toward the reservoir is installed at the seventh reservoir flow channel.

19. The electronic brake system of claim 14, wherein:
a first reservoir solenoid valve configured to selectively allow a two-way fluid flow is installed at the sixth reservoir flow channel; and
a second reservoir solenoid valve configured to selectively allow a two-way fluid flow is installed at the seventh reservoir flow channel.

20. The electronic brake system of claim 19, wherein the first and second reservoir solenoid valves are normally closed type valves that operate to be normally closed and be open when an open signal is received.

* * * * *